United States Patent [19]

Ben-Shmuel et al.

[11] Patent Number: 4,497,439
[45] Date of Patent: Feb. 5, 1985

[54] HEAT EXTRACTOR

[75] Inventors: Dan Ben-Shmuel; Philip Zacuto, both of St. Johnsville, N.Y.

[73] Assignee: Heat Extractor Inc., Melrose, Mass.

[21] Appl. No.: 380,606

[22] Filed: May 21, 1982

Related U.S. Application Data

[63] Continuation-in-part of Ser. No. 907,667, May 19, 1978, Pat. No. 4,340,572.

[51] Int. Cl.³ .............................................. F24D 5/00
[52] U.S. Cl. .............................. 237/53; 165/DIG. 2; 261/151; 122/7 R
[58] Field of Search ............... 165/DIG. 12, DIG. 2, 165/134 DP; 261/151; 122/7 R; 237/55, 50, 53

[56] References Cited

U.S. PATENT DOCUMENTS

| 4,129,179 | 12/1978 | Molitor | 237/55 |
| 4,194,558 | 3/1980 | Goosman | 165/DIG. 12 |
| 4,287,138 | 9/1981 | Bucknel | 261/151 |

Primary Examiner—Henry Bennett
Attorney, Agent, or Firm—Thompson, Birch et al.

[57] ABSTRACT

A heat extractor system for a furnace, said furnace including a burner with a chimney that is connected but is normally not in operation. Instead, the furnace is connected to a vent in parallel with the chimney through a draft-inducing arrangement including a water spray in which water is heated and circulated to a point where the heat from the water is utilized. Due to the parallel arrangement of the vent and chimney, if the vent fails to operate, it will function in a fail-safe manner, with the combusted gases from the burner leaving through the chimney.

8 Claims, 8 Drawing Figures

U.S. Patent  Feb. 5, 1985  4,497,439
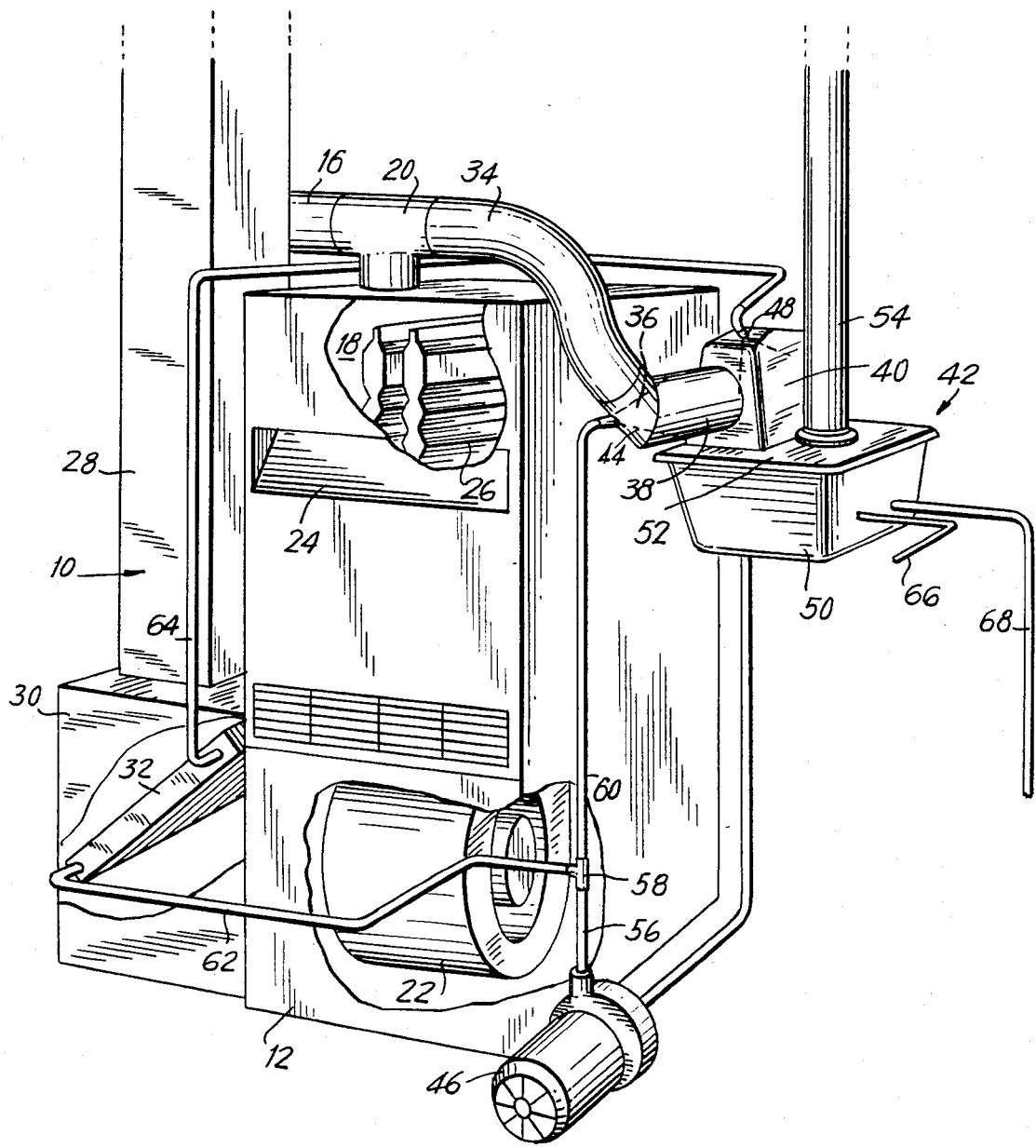

HEAT EXTRACTOR

CROSS-REFERENCE TO RELATED APPLICATION

This application is a continuation-in-part of copending application Ser. No. 907,667 filed May 19, 1978 for Heat Extractor now U.S. Pat. No. 4,340,572.

BACKGROUND OF THE INVENTION

Certain features of said previous application shown and described, but not claimed therein, are shown and described and claimed in the present application, and other features of the previous application shown, described and claimed therein are shown and described, but not claimed, in the present application. Other features are shown, described and claimed for the first time herein.

1. Field of the Invention

The present invention pertains to the efficient utilization of fuel. Even more specifically, the invention relates to the efficient utilization of fuel such as oil fuel or gas fuel burning in a furnace, usually a domestic furnace, although not necessarily so. The present invention differs from that of the initially filed application which related to the burning of fuel, including coal, wherein the flue gas stream included particulate material. Pursuant to the present invention, there is little or no particulate material in the flue gas, and the particulate material that is present principally takes the form of soot. Even this only is present when oil is burning and is almost entirely absent when gas is burning. A gas flame is very clean and creates essentially no particulate loading. An oil flame may, and frequently does, have some toxic material in its products of combustion and, as a rule, a gas flame has no toxic fumes in its products of combustion. The combusted gas stream issuing from a furnace that is burning gas does not require cleaning, and the combusted gas stream that is fed to a smokestack from a burner that is operating with a properly balanced oil burner does not, as a rule, require very much cleaning. The special field of the instant invention is particularly concerned with the recovery of heat from the stack gas of domestic furnaces and, in the process, reducing the temperature of the stack gas to, or close to, ambient temperature.

More particularly, the present invention pertains to a heat recovery system in which stack gases from an oil- or gas-fired domestic furnace are diverted in their passage to a chimney and routed through a heat recovery unit where the heat from the waste gases is recovered and used, for example, to heat tap water which subsequently can be employed for domestic hot water or as a hot air preheater. The present invention has several other features too numerous to describe at this point but which will be pointed out as the description proceeds.

2. Description of the Prior Art

The recovery of low level, previously wasted heat from sources such as flue gas has received attention in recent years because of the energy crisis. The cost of conventional fuels such as oil, coal, and especially natural gas, has escalated to the point where it is now profitable to install ancillary heat recovery units to recover previously wasted heat contained in system effluents such as flue gas. The problem of efficiently and usably recovering such heat is compounded by the fact that it is available only at a relatively low temperature level and, in the case of flue gas, the sensible and latent heat contained in the gas must be recovered from a large quantity of gas having a low heat content. Flue gas produced by burning sulfur-containing fuels is of an extremely corrosive nature, especially when the flue gas is scrubbed by aqueous media which generates sulfurous and sulfuric acids in situ.

Heat recovery schemes of various types are shown in U.S. Pat. Nos. 1,986,529; 2,878,099; 3,169,575; 3,439,724; 1,083,885 and 4,129,179.

SUMMARY OF THE INVENTION

1. Purposes of the Invention

It is an object of the present invention to provide a method and apparatus for the efficient and economical recovery of heat.

It is another object of the present invention to recover heat from low temperature sources in an improved manner.

It is a further object of the invention to increase the thermal efficiency of domestic heating apparatus to 95%.

It is another object of the invention to recover heat from fossil fuel combustion waste gas streams economically and providing 95% or greater utilization of the heating value without the deterioration of the heat transfer system by the products of combustion.

It is a further object of the invention to efficiently recover waste heat in a domestic furnace.

It is a further object of the invention to provide a high heat transfer and low mass transfer device and method for the direct contact transfer of heat from a gas to a liquid medium.

It is a still further object of the invention to recover usable heat from a waste gas stream.

It is yet another object of the invention to recover previously wasted heat from process gas streams.

It is another object of the invention to lower fuel consumption in facilities which generate a hot waste gas stream.

It is a further object of the invention to aid in alleviating the energy crisis facing the nation.

It is still another object of the invention to raise the overall thermal efficiency of installations which generate low level heat, that is to say, low to moderate temperature gas streams.

It is yet another object of the invention to provide a method and apparatus for recovering usable heat from a waste gas stream which can be of original equipment manufacture or retrofitted to any existing heating installation.

It is a further object of the invention to recover heat previously lost by atmospheric discharge of flue gas through a chimney stack.

It is still another object of the invention to heat process water, preheat boiler water makeup, heat spaces and provide moderate temperature heat for other applications using previously wasted heat which is recovered in an efficient and economical manner.

It is a further object of the invention to economically and thermally match heat transfer systems to provide comfort heating by the combustion of fossil fuels and their most efficient utilization.

It is a further object of the invention to economically and thermally match heat transfer systems to recover heat from waste gas streams from fossil fuel combustion to provide comfort heating or other domestic use.

It is another object of the invention to provide a method and apparatus which will create an automatic draft effect for flue gas to be fed from a smokestack through a contact unit.

It is another object of the invention to provide a method and apparatus which will automatically provide a lower pressure path when the same is operational with gases which are transferring heat to a process fluid and yet which, when this alternate is not functioning, will automatically fail-safe to a chimney path.

It is another object of the invention to provide a method and apparatus in which a pump is employed to force heated water through a heat exchange unit while the water is being heated by heat from the flue gas, the pump being turned on by a burner control, but turned off by a fan control so that the pump is deactivated only at the last moment and pumps until the water moved thereby is almost cold.

These and other objects and advantages of the present invention will become evident from the description which follows.

2. Brief Description of the Invention

In the present invention, the method of recovering usable heat from a gas stream includes providing an external sump in which water is accumulated. The water is pumped from the sump to a heat exchanger located in an entrance box connecting returning air from the heated space to the furnace or other heating mechanism so that if the water is warm it will preliminarily heat this return air.

Water is pumped from the heat exchanger to a water jet in a hood above the sump. This jet constitutes a spray providing good water contact between water droplets and the hot exhaust gases so that the hot exhaust gases cool down and the water is heated and falls warm into the sump. The spray also exerts an accelerating force on the exhaust gases, creating a draft or suction which induces the flow of gases through the diversion smoke pipe leading from the chimney to the space above the sump.

A second jet in the diversion smoke pipe is fed by the pump to provide the induced draft whereby to move the hot exhaust gases and to heat the water which has its temperature raised considerably.

The water is pumped back out of the sump to the heat exchanger and to the jets, continuing in a recirculating path and further raising the temperature of the heat exchanger and therefore of the heated return air. This continues as long as the pump is running. Ultimately, the pump stops, being turned off when the fan on the furnace blower is turned off; that is to say, a common control turns them both off. By the time that the fan turns off, the hot water in the sump has cooled considerably so that most of the heat in the sump has been dissipated by heating the return air and maximum use has been made of this hot water, thereby increasing efficiency of the system.

The system has certain advantages; thus, the system fails-safe. For example, the two Venturi effects provided by the jets successively reduce the pressure in the diversion smoke pipe. If either of these fail, the low pressure in the diversion smoke pipe, which during normal operation of the system is below chimney pressure, rises to a pressure above the pressure in the chimney so that the flow of the exhaust gases now takes place through the old chimney instead of through the flue gas exit. It is pointed out that, due to the heat extracted by the sump, the flue gases leave through the flue gas exit at a temperature of about 90° to 100° F. in contrast to a temperature of about 400° to 700° F. at which it would normally exit through the old chimney, and thus, the temperature to which it will return if there is a blockage preventing exit from the flue gas exit.

BRIEF DESCRIPTION OF THE DRAWING

The sole FIGURE is a perspective view of an apparatus for carrying out the invention.

DETAILED DESCRIPTION OF THE PREFERRED EMBODIMENT

Referring now in detail to the sole FIGURE, the reference numeral 10 denotes a system incorporating the invention. Said system has either been retrofitted or built to include original equipment so that it can function pursuant to the present invention. Regardless of whether it is retrofitted or is equipment of an O.E.M., the system 10 includes certain basics plus certain auxiliaries pursuant to the instant invention. The basics include a furnace 12 connected to a chimney (not shown). It should be mentioned that the chimney is part of the original equipment. Even if the furnace is being installed new, a chimney will be built to go along with it. It is "part of the package". The chimney exits at a high point in the building as is conventional and, also as is conventional, usually will be made of brick or is lined with clay tile inside a brick flue, and will draw a substantial draft. The draft is far too much for the furnace needs, in view of the fact that the furnace is essentially fuel efficient and operates on a low air-to-fuel ratio.

A flue pipe 16 connects the combustion chamber 18 of the furnace to the chimney through one branch of a T-fitting 20. A standard fuel burner (not shown) is located in the combustion chamber. This either will be a gas burner or an oil burner, depending on the fuel to be burned, and will be tuned for maximum burner efficiency.

Air is supplied from the room in which the furnace is located, e.g. a cellar. In order to reduce the amount of draft at the furnace, it is customary to provide the casing of the furnace with a shuttered opening, that is to say, an opening having a damper 24 therein known as a diverter.

Internally the furnace includes a furnace heat exchanger 26.

Assuming that the furnace is a hot air furnace, return air is fed from the various rooms through sundry collector ducts (not shown) to a return duct 28 that leads to a collector box 30 from which the air is introduced into the furnace heat exchanger. A preheater heat exchanger 32 is located in the collector box for the purpose of warming air passing through said box on its way to the furnace intake via the furnace blower 22.

The furnace blower is controlled by an electrical system (not shown) which is controlled thermostatically by air temperature as, for example, in one of the ducts. A conventional thermostat (not shown) is employed to start the furnace. When the temperature of the thermostat drops below a predetermined setting, the furnace burner turns on. When it rises above a certain setting, the furnace burner shuts off.

For recovery of heat from the combusted exhaust gases, the combusted gases are diverted from the chimney. For this purpose, there is provided a diversion smoke pipe 34 connected to a second branch of the T-fitting 20 and running to an elbow 36. Preferably, the elbow is connected to the diversion smoke pipe so that it is readily replaceable because this elbow may be subjected to highly corrosive materials. The metal is essentially impervious. However, the liquid is corrosive and in time there may be need for replacement.

Preferably, the elbow 36 is made of stainless steel because it is constantly being sprayed with water from a jet 44 located in the center of the bend of the elbow on the outer side thereof and is fed with acidic water under pressure from a pump 46. The jet is directed toward the run 38. The jet is an expanding conical jet in the form of a cone of fine beads of water the configuration of which is indicated by dotted lines in the sole FIGURE of the drawing. The jet strikes the hot flue gases passing through the diversion smoke pipe leading from the out-of-use chimney, these gases being absorbed and dissolved in the water and some of the gases forming sulfurous and sulfuric acids which are corrosive. It is because these acids are corrosive that the pipe preferably is made of a material highly resistant to such corrosion, and it is for the same reason that the elbow and pipe may need to be replaced.

It also should be mentioned that the water jet has a Venturi effect. It introduces a draft in the elbow and run of pipe as well as in the diversion smoke pipe which reduces gas pressure in the diversion smoke pipe and pulls exhaust gases from the old chimney route into the diversion smoke pipe.

To assist this diversion action, a second water jet is provided, this latter jet being located in the hood 40. The second jet is denoted by the reference numeral 48 and it, too, is indicated by dotted lines in the drawing. It, too, creates a fine conical spreading spray but it is confined to the hood and is directed downwardly into the bottom of the hood and into the broad base of the contact section 42.

The contact section will be seen to be comprised of three essential parts, namely, the hood 40, a sump 50 covered by a lid 52, and a vent 54 extending from the lid 52 to an exit point at the side of the house considerably below the chimney exit.

The second jet 48, as noted above, further pulls exhaust gases along the diversion smoke pipe. It also further reduces the temperature of the exhaust gases until, finally, the exhaust gases, by the time they reach the exit from the vent 54, are at a temperature of about 90° to 100° F. In other words, they are quite cool as they exhaust from the vent out the side of the house.

The water for the two jets 36 and 48 is supplied by the pump 46. The outlet from the pump passes through a conduit 56 through a T 58 to another conduit 60 which leads to the jet 36. From the T a branch conduit 62 leads to an inlet for the preheater heat exchanger 32 the outlet from which passes through a conduit 64 that leads to the jet 48.

Cold water is supplied to the sump 50 through a supply pipe 66 entering the sump through a conventional float control valve (not shown) located inside the sump. This valve controls the level of water in the sump. When the level reaches a predetermined setting, it is cut off by closing of the valve through raising of the float. If there is too much water present, it runs out through an overflow 68 leading to a drain.

There are several interesting features to the system just described. For one thing, it is a fail-safe. Thus, if one or both of the jets fail, for instance by failure of the pump, the pressure within the diversion smoke pipe automatically rises to above the pressure prevailing in the old chimney which has been left in the system and which then starts to function so that it replaces the vent 54. Such replacement takes place automatically because the pressure in the diversion smoke pipe then exceeds the pressure in the chimney. The difference between the two pressures, when the diversion smoke pipe is functioning, is caused by the operation of two Venturi effects brought about by the jets 36, 48.

Another interesting effect of the present furnace is that, because it operates so efficiently, it draws in very little air from its surroundings and, hence, wastes but little heat. Unlike many hot air furnace installations, it does not suck in appreciable amounts of warm room air and allow it to escape up the chimney, i.e. its intake of room air is negligible because of the low chimney temperature so that there is essentially no fuel lost in heating up such air. That would represent an inefficient operation.

A further interesting observation to be noted is the omission of a vent damper which is conventionally found in many oil- or gas-fired furnaces. The present furnace has no vent damper. The damper can be eliminated because the instant furnace does not employ a hot stack, i.e., a chimney, so there is no need to relieve a substantial draft created by it.

It thus will be seen that there is provided a device which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawing is to be interpreted as illustrative and not in a limiting sense.

Having thus described the invention there is claimed as new and desired to be secured by Letters Patent:

1. For use with a chimney and a furnace fired by a burner, a heat extractor system including:
    (a) first means directly connecting the furnace to the chimney,
    (b) a vent having an entrance end and an exit end higher than its entrance end,
    (c) second means connecting the entrance end of the vent to the furnace,
    (d) means for creating a spray of water in the second connecting means to induce a draft therein in the direction toward the exit end of the vent,
    (e) said water being heated by combusted gases from the burner passing through the second connecting means, and
    (f) means to utilize the heat of said water,
    (g) said vent functioning as a fail-safe such that, if a draft is not induced in said second connecting means, combusted gases from the burner will automatically divert and leave through the chimney, choosing the path of least resistance.

2. A heat extractor system as set forth in claim 1 wherein the system includes a heat exchanger in a return air duct to the furnace, and wherein the heated water is collected in a sump before being passed through the heat exchanger to heat said return air.

3. A heat extractor system as set forth in claim 2 wherein the water, after leaving the heat exchanger, is led to a jet in a hood overlying the sump to assist in inducing flow of gas from the diversion smoke pipe to the sump and then to the vent.

4. For use with a chimney and a furnace fired by a burner, a heat extractor system including:

(a) a vent having an entrance end and an exit end higher than said entrance end,
(b) a sump external to the furnace,
(c) means supplying water to the sump,
(d) means to maintain the water at a predetermined level in the sump,
(e) means to connect the vent entrance end to the sump above the water level therein,
(f) means to connect the vent exit end to the atmosphere at a level above the level of the entrance end of the event,
(g) a hood for the sump,
(h) a diversion smoke pipe having an intake end connected to the furnace and an outlet end connected to the hood,
(i) means to draw water from the sump and to inject said water as a draft-inducing spray into the diversion smoke pipe on the way into the hood so that said water contacts the combusted gases in the diversion smoke pipe and is warmed thereby and then fed to the sump whereby to induce a flow of combusted gases from the furnace to the sump and then to the vent, and
(j) means to utilize the warmed water from the sump as a source of heat.

5. For use with a chimney and a furnace of the type which is fired by a burner generating combusted gases, and which has a casing with an exit through which the combusted gases escape, a heat extractor system comprising:
(a) a T-fitting in the exit,
(b) a conduit connecting one branch of the T-fitting to the chimney,
(c) a diversion smoke pipe connected to the other branch of the T-fitting,
(d) a vent having an intake and an outlet to the atmosphere lower than the chimney outlet,
(e) a sump external to the furnace,
(f) means supplying water to the sump,
(g) means to maintain the water at a predetermined level in the sump,
(h) means to connect the vent intake to the sump above the water level therein,
(i) means to draw water from the sump and to inject said water as a draft-inducing spray into the diversion smoke pipe on the way into the hood so that said water contacts the combusted gases in the conversion smoke pipe and is warmed thereby and then fed to the sump, and
(j) means to utilize the warmed water from the sump as a source of heat.

6. A heat extractor system as set forth in claim 5 wherein water is fed by a pump from the sump to a jet in the diversion smoke pipe to induce flow of combusted gases from the chimney to the hood and then to the vent.

7. A heat extractor system as set forth in claim 6 wherein the pump forces heated water to a heat exchanger and then to a second jet in the path of the combusted gases to the sump, and wherein the pump is turned on by a switch that controls the burner and is turned off by a switch that controls a furnace blower which draws air to be heated into contact with said heat exchanger.

8. A heat extractor system as set forth in claim 7 wherein the chimney without the system in operation is at a temperature of about 400° to 700° F. in comparison with a vent temperature of about 90° to 100° F. when the system is in operation.

* * * * *